(12) United States Patent
Sarp et al.

(10) Patent No.: US 9,428,406 B2
(45) Date of Patent: Aug. 30, 2016

(54) MEMBRANE BASED DESALINATION APPARATUS WITH OSMOTIC ENERGY RECOVERY AND MEMBRANE BASED DESALINATION METHOD WITH OSMOTIC ENERGY RECOVERY

(71) Applicant: GS ENGINEERING & CONSTRUCTION CORP., Seoul (KR)

(72) Inventors: Sarper Sarp, Seoul (KR); In-Ho Yeo, Seoul (KR); Yong Gyun Park, Seoul (KR)

(73) Assignee: GS ENGINEERING & CONSTRUCTION CORP., Seoul (KR)

( * ) Notice: Subject to any disclaimer, the term of this patent is extended or adjusted under 35 U.S.C. 154(b) by 317 days.

(21) Appl. No.: 14/090,323

(22) Filed: Nov. 26, 2013

(65) Prior Publication Data

US 2014/0238938 A1  Aug. 28, 2014

(30) Foreign Application Priority Data

Feb. 22, 2013 (KR) .......... 10-2013-0018956
Oct. 10, 2013 (KR) .......... 10-2013-0120295

(51) Int. Cl.
*C02F 1/44* (2006.01)
*B01D 61/02* (2006.01)
*B01D 61/06* (2006.01)

(52) U.S. Cl.
CPC .............. *C02F 1/441* (2013.01); *B01D 61/022* (2013.01); *B01D 61/025* (2013.01); *B01D 61/06* (2013.01); *C02F 1/445* (2013.01); *B01D 2317/022* (2013.01); *C02F 1/442* (2013.01); *C02F 2303/10* (2013.01); *Y02W 10/30* (2015.05)

(58) Field of Classification Search
CPC .......... B01D 2317/022; B01D 61/022; B01D 61/025; B01D 61/06; C02F 1/441; C02F 1/442; C02F 1/445; C02F 2303/10; Y02W 10/30
USPC ................................. 210/252, 641
See application file for complete search history.

(56) References Cited

U.S. PATENT DOCUMENTS

2013/0037464 A1   2/2013  Friedrichsen et al.

OTHER PUBLICATIONS

Kim et al., "Reverse osmosis (RO) and pressure retarded osmosis (PRO) hybrid processes: Model-based scenario study", Desalination 322 (2013) 121-130.

*Primary Examiner* — Dirk Bass
(74) *Attorney, Agent, or Firm* — Bacon & Thomas, PLLC

(57) ABSTRACT

An energy efficient membrane based desalination process, which utilizes an osmotically driven energy recovery sub-process. Energy recovery sub-process involves the extraction of water from low salinity first aqueous solution by using a high salinity content, pressurized second aqueous solution to draw the water from first aqueous solution across a semi-permeable membrane. High salinity content, pressurized second solution can be used to generate osmotic pressure on the low salinity content first solution to drive water from first solution to the second solution with respect to chemical potential differences. The process also harvests the Gibbs free energy of mixing in terms of pressure conservation in the second solution, while the volume of second solution is increasing by the drawn water from the first solution.

13 Claims, 9 Drawing Sheets

MEMBRANE BASED DESALINATION APPARATUS WITH OSMOTIC ENERGY RECOVERY AND MEMBRANE BASED DESALINATION METHOD WITH OSMOTIC ENERGY RECOVERY

FIELD OF THE INVENTION

The invention relates generally to the field of water treatment and energy recovery. More particularly, the invention relates to high salinity water treatment, seawater desalination, pressure recovery from desalination processes, energy production from desalination processes or any other rejection of solutes from a high salinity aqueous solution and related energy and/or pressure recovery.

BACKGROUND OF THE INVENTION

Due to the constant increasing demand for potable water for drinking and irrigational use, seawater desalination maintains its importance. Furthermore, economically feasible and large scale seawater desalination is specifically important because of the continuous growth in the population and related growth of the industry. Even though, membrane based desalination is less energy intensive process, compared to thermal desalination, the energy consumption is still high and needs to be lowered with a more environmentally friendly and economically feasible desalination process.

Several methods for less energy intensive desalination have been developed including forward osmosis and harvesting of hydraulic energy from a direct osmosis process (PCT/US02/02740, PCT/ES2011/070218). Despite its theoretical energy free mechanism, no feasible applications have been found for forward osmosis. The main problem with the forward osmosis is the extraction of the drawn water from draw solution and the recovery of the draw solution with a continuous and feasible process. On the other hand pressure retarded osmosis (PRO) has been proven to be more than promising process for energy production and recovery process (Statkraft Osmotic Power Pilot Plant, Norway). However, an innovative engineering design for the maximum energy recovery and/or production is required for the commercialization of the PRO process.

The driving force of the osmotic process is the osmotic pressure difference between the two aqueous solutions on the opposite sides of the semi-permeable membrane. Osmotic pressure of an aqueous solution can be calculated by using Van't Hoff relation:

$$\pi = \theta \cdot v \cdot c \cdot R \cdot T.$$

where, v is the number of ions produced during dissociation of the solute, $\theta$ is the osmotic coefficient, c is the concentration of all solutes (moles/l), R is the universal gas constant (0.083145 l·bar/moles·K), and T is the absolute temperature (K).

The water flux through a semi-permeable membrane by osmotic pressure difference is given as (McCutcheon and Elimelech, 2007):

$$J_w = A(\pi_{D,b} - \pi_{F,b})$$

where, Jw is the water flux through the semi-permeable membrane, A is the pure water permeability coefficient of the semi-permeable membrane, $\pi_{D,b}$ and $\pi_{F,b}$ are the bulk osmotic pressures of draw and feed solutions, respectively.

PRO can be used to generate or recover energy (power) by utilizing the Gibbs free energy of mixing with respect to the salinity difference of two aqueous solutions (Sandler, S. I., 1999, Chemical Engineering Thermodynamics, 3rd ed.; Wiley).

$$-\Delta G_{mix} = RT\{[\Sigma x_i \ln(\gamma_i x_i)]_M - \theta_A [\Sigma x_i \ln(\gamma_i x_i)]_A - \theta_B [\Sigma x_i \ln(\gamma_i x_i)]_B\}$$

where, xi is the mole fraction of species i in solution, R is the gas constant, T is temperature, and $\gamma$ is the activity coefficient of the species.

In a PRO system, a constant hydraulic pressure is applied on the high salinity aqueous solution and permeation of water from low salinity aqueous solution continues while the osmotic pressure difference of two solutions is higher than the applied hydraulic pressure. Pressure of the high salinity aqueous solution can be conserved with the additional energy from Gibbs free energy of mixing while the volumetric flux of the solution increases. Yip and Elimelech (2012) found that the highest extractable work in a constant-pressure PRO process is 0.75 kWh/m3 when seawater and river water were used for draw and feed solutions, respectively. Therefore harvested Gibbs free energy of mixing, in terms of pressure and volume, can be used to produce energy and/or recover pressure.

In case of energy production; a water turbine can be used to generate power by utilizing the pressure and volumetric flux of the aqueous solution. Even though the modern Pelton turbines can reach up to 92% efficiency, the average efficiency is generally around 90%.

In case of pressure recovery; there has not been an engineering application to use the harvested Gibbs free energy of mixing with a PRO process for pressure recovery of a membrane desalination process. Modern seawater reverse osmosis processes use pressure exchangers to recover pressure from the brine and to pre-pressurize the seawater before entering the RO process. In this way, up to 60% of the required energy for pressurizing the seawater for RO process can be saved. Modern pressure exchangers, such as isobaric pressure exchangers, can reach an efficiency of 97%. Therefore pressure recovery can be a better alternative than energy production for membrane based seawater desalination because of its higher recovery efficiency.

SUMMARY OF THE INVENTION

The invention provides a method of integrating an osmotic process, such as PRO, into the membrane based (or pressure driven) desalination process, such as SWRO, in order to lower the energy consumption of the SWRO process by harvesting Gibbs free energy of mixing in terms of pressure conservation.

The inventive method of energy recovery is illustrated by a first embodiment of the invention in which pre-treated high salinity aqueous inlet solution, such as seawater, is exposed to two different pressure exchange devices in order to manipulate the pressure of the solution. First of the two pressure exchange devices is set to increase the pressure of the inlet aqueous solution to a lower level than the second pressure exchange device. Inlet aqueous solution from first and second pressure exchange devices are then exposed to a further pressure manipulation by two different devices, such as pumps, in order to elevate the pressure of the final inlet aqueous solution to a level which is suitable for membrane based desalination, such as SWRO.

The low salinity aqueous solution, from membrane based desalination process, is then taken as a product and can be used for potable purposes.

High salinity and high pressure product from the membrane based desalination process, named as brine, is then given to the second pressure exchange devise, where the pressure of the brine stream is lowered by the pressure exchange device. Low pressure brine stream is then given to the third pressure manipulation device, such as pump, where the pressure of the stream is increased to moderate level.

Moderate pressure brine stream, named as draw solution, is then given to an osmotic membrane process, such as PRO, where it is exposed to the first surface of the semi-permeable membrane. A second low salinity aqueous solution, named as feed solution, such as treated wastewater, brackish water, or surface water, is exposed to the second surface of the semi-permeable membrane. Before it is exposed to the second surface of the semi-permeable membrane, feed solution is given to a pretreatment and/or pressure and volumetric flow rate manipulation device, such as filtration and pumps.

The concentration gradient between draw and feed solutions then draws the water from the feed solution through the semi-permeable membrane and into the draw solution increasing the volumetric flow rate of the draw solution. During the drawing process of water from feed to draw solution, the mixing of the water, which is drawn through the semi-permeable membrane and has low salinity, and the draw solution releases the Gibbs free energy of mixing. The released Gibbs free energy of mixing is harvested in terms of pressure conservation and keeps the pressure of the draw solution relatively constant while the volumetric flow rate of the draw solution increases.

Concentrated feed solution is then taken from the osmotic membrane process and can be recycled back to its source or can be used in a further treatment process.

Diluted, moderate pressure and high volumetric flow rate draw solution, which has the same volumetric flow rate as the inlet aqueous solution which is given to the first pressure exchanger device, in order to pressurize the inlet high salinity aqueous solution.

After pressure exchange, low pressure high volumetric flow rate draw solutions are taken from the process and can be disposed or can be used in further treatment process.

Above mentioned process parameters are to be adjusted with respect to the quality and quantity data for the inlet aqueous solutions and desired system parameters. The data can be collected by using various methods including but not limited to; literature review, bench and/or pilot scale experiments, quality monitoring, and etc.

Additional features, advantages, and embodiments of the invention may be set fourth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

The invention is generally directed to a method and apparatus for energy efficient desalination process. Both the method and the apparatus of the invention, for three preferred embodiments, are shown and described with reference to FIGS. 1, 2, 3, 4, 5, 6, 7, 8, and 9. Throughout the description like reference numbers are used in all figures to describe same features.

Figure 1:
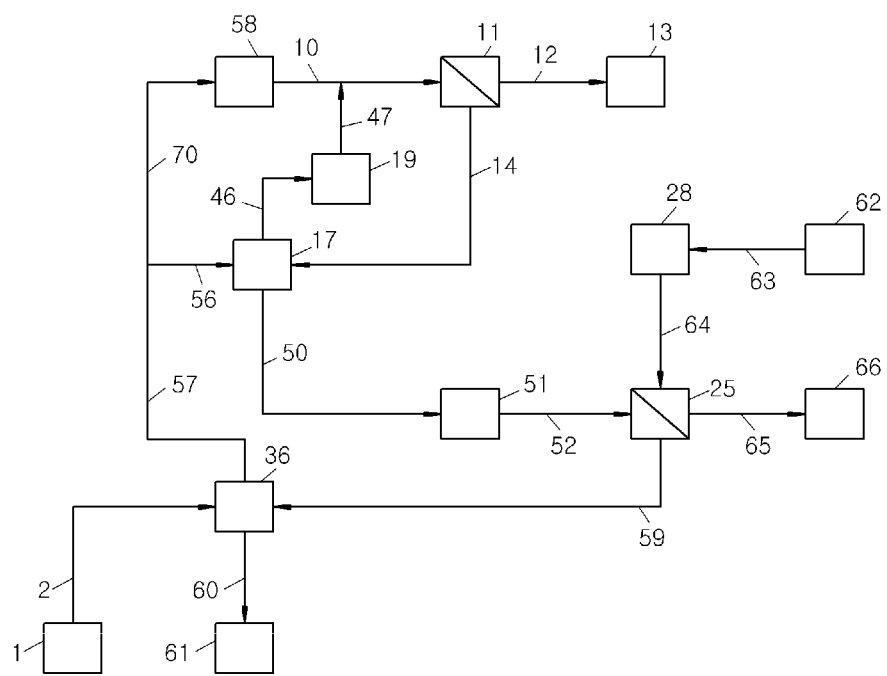
FIG. 1 is the first preferred schematic diagram of the water treatment method in accordance with the invention.
Figure 2:
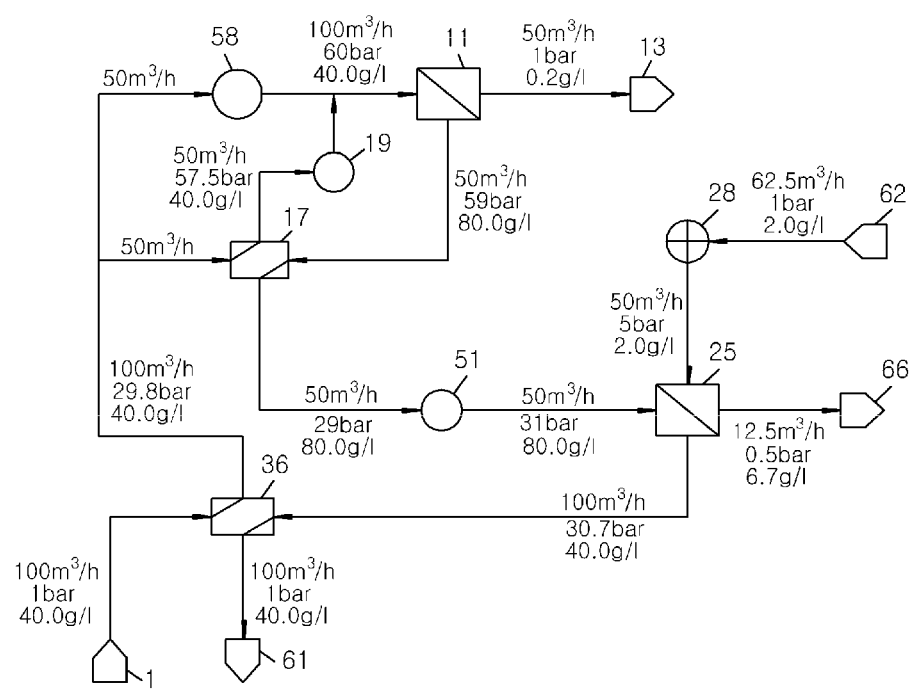
FIG. 2 is the detailed exemplary flow diagram of the first preferred schematic diagram of the water treatment method in accordance with the invention.
Figure 3:
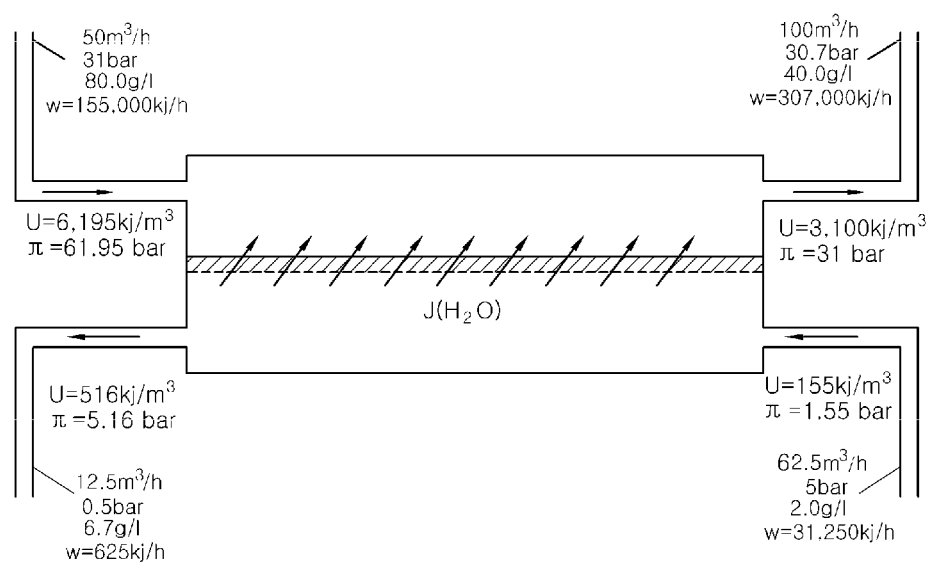
FIG. 3 is the exemplary mass and energy balance of the detailed osmotic membrane process which is used in the first and second preferred schematic diagram of the water treatment method in accordance with the invention.

As for the first preferred embodiment, FIG. 1 is the first preferred schematic diagram of the water treatment method in accordance with the invention, and FIG. 2 is the detailed exemplary flow diagram of the first preferred schematic diagram of the water treatment method in accordance with the invention, and FIG. 3 is the exemplary mass and energy balance of the detailed osmotic membrane process which is used in the first and second preferred schematic diagram of the water treatment method in accordance with the invention.

As shown in FIG. 1, the inlet solution with high salinity stored in chamber 1, for example, pretreated seawater is given to the first pressure exchange device 36 as the first solution 2 and is pressurized. Pressurized first solution 57 is then separated to the second solution 70 and the third solution 56 by means of separation for example, multi-way valve, and then the third solution 56 is exposed to the second pressure exchange device 17. Pressurized third solution 46 in the second pressure exchange device 17 is further exposed to the first pressure manipulation device 19, for example, booster pump.

The second solution 70 is exposed to the second pressure manipulation 58, for example, high pressure pump, and pressurized second solution 10 is mixed with further pressurized third solution 47, and the fourth solution which is the mixed solution of pressurized second solution 10 and further pressurized third solution 47, is given to the first osmosis chamber 11 which includes the first semi-permeable membrane for desalination, for example, reverse osmosis.

Low salinity and potable quality solution 12, for example, permeate or product water, is taken from the first osmosis chamber 11 and is given to the chamber 13 for further use, such as drinking, irrigation, or industrial use.

The fifth solution 14 which is the fourth solution with high pressure and concentrated by being exposed to the first semi-permeable membrane of the first osmosis chamber 11, is exposed to the second pressure exchange device 17 for pressurizing the third solution 56.

The pressure of the fifth solution 14 is lowered after being exposed to the second pressure exchange device 17. Low pressure fifth solution 50 is than exposed to the third pressure manipulation device 51, such as booster pump, where the low pressure fifth solution 50 is pressurized to the desired levels.

The fifth solution pressurized in the third pressure manipulation device 51, as high salinity and high pressure fifth solution 52, is given as draw solution to the second osmosis chamber 25 where the high salinity and high pressure fifth solution 52 is exposed to the first surface of the second semi-permeable membrane for osmotically driven process.

Meanwhile, the chamber 62 stores any one or more than one of the primary treated wastewater, the secondary treated wastewater, the tertiary treated wastewater, brackish water, ground and surface water, and the sixth solution 63 which has lower salinity than the high salinity and high pressure fifth solution 52, is given to the chamber 28, where the quality, quantity, pressure and volumetric flow rate of the sixth solution 63 is adjusted to the desired levels for said second semi-permeable membrane. Chamber 28 may include any manipulation device to differentiate pressure and volumetric flow rate with respect to desired quality and quantity of the aqueous solution.

Manipulated sixth solution 64 is then given to the second osmosis chamber 25 as a feed solution, and exposed to the second surface of the second semi-permeable membrane. The salinity gradient between the high salinity and high pressure fifth solution 52 and the manipulated sixth solution 64 draws water from the manipulated sixth solution 64 to the high salinity and high pressure fifth solution 52, increasing the volumetric flow rate of the high salinity and high pressure fifth solution 52.

Said first and second semi-permeable membrane may be chosen from those of nano osmosis membrane, reverse osmosis membrane, PRO membrane, RO membrane, NF membrane, etc.

Drawn water from the manipulated sixth solution 64 through the second semi-permeable membrane in the second osmosis chamber 25 has a very low salinity, and when said drawn water is mixed with the high salinity and high pressure fifth solution 52, the salinity gradient between two solutions releases Gibbs free energy of mixing. Released Gibbs free energy of mixing conserves the moderate pressure level in the high salinity and high pressure fifth solution 52.

Diluted fifth solution 59 which has larger volumetric flow rate and relatively same pressure with the high salinity and high pressure fifth solution 52, is taken from the second osmosis chamber 25, and is given to the first pressure exchange device 36 for pressurizing the first solution 2. Depressurized fifth solution 60 is then given to chamber 61 for further treatment or disposing processes.

Meanwhile, concentrated sixth solution 65, which lost water by being exposed to the second semi-permeable membrane, is given to the chamber 66 for further treatment or saving.

FIG. 2 shows a detailed exemplary diagram of the mass balance of the first preferred embodiment including the salinity, volumetric flow rate, and pressure specifications of the solutions. Mass balance calculations are based on 100 $m^3/h$ volumetric flow rate of inlet high salinity aqueous solution, such as pre-treated seawater, 50% recovery efficiency of first semi-permeable membrane process, such as SWRO, of the first osmosis chamber 11, and 100% volumetric flow rate increase from the second semi-permeable membrane process, such as PRO, of the second osmosis chamber 25.

FIG. 3 is the exemplary mass and energy balance of the detailed osmotic membrane process which is used in the first and second preferred schematic diagram of the water treatment method in accordance with the invention.

Figure 4:
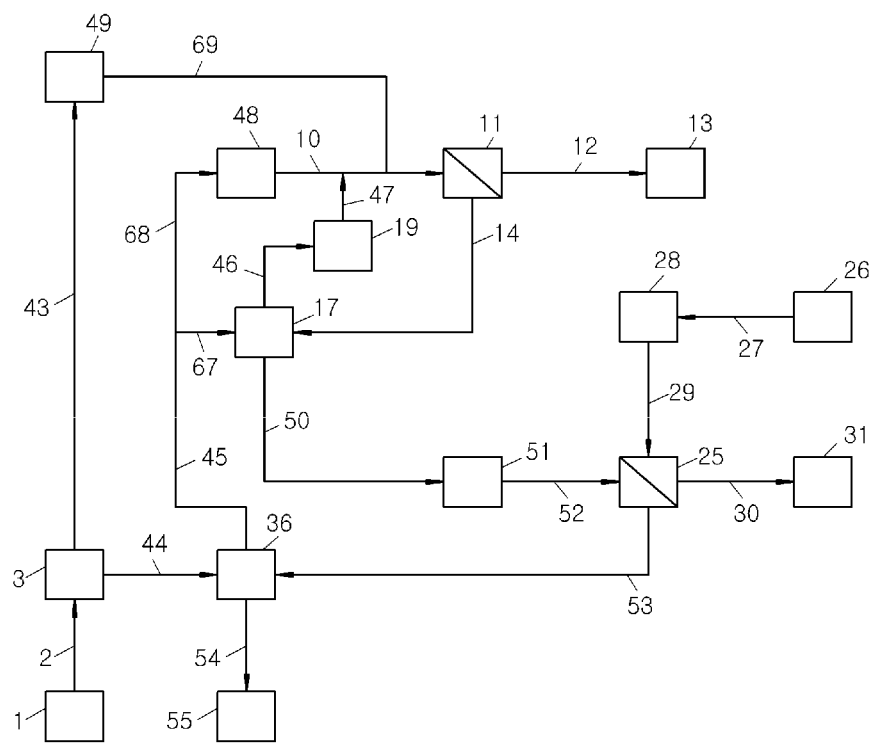
FIG. 4 is the second preferred schematic diagram of the water method in accordance with the invention.
Figure 5:
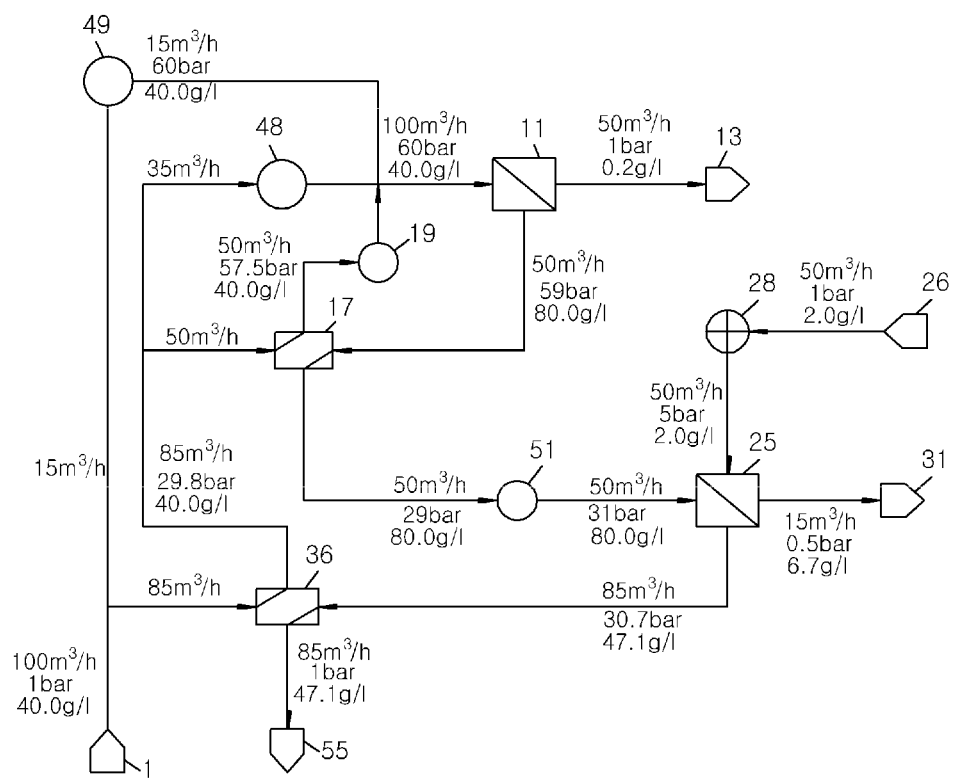
FIG. 5 is the detailed exemplary flow diagram of the second preferred schematic diagram of the water treatment method in accordance with the invention.
Figure 6:
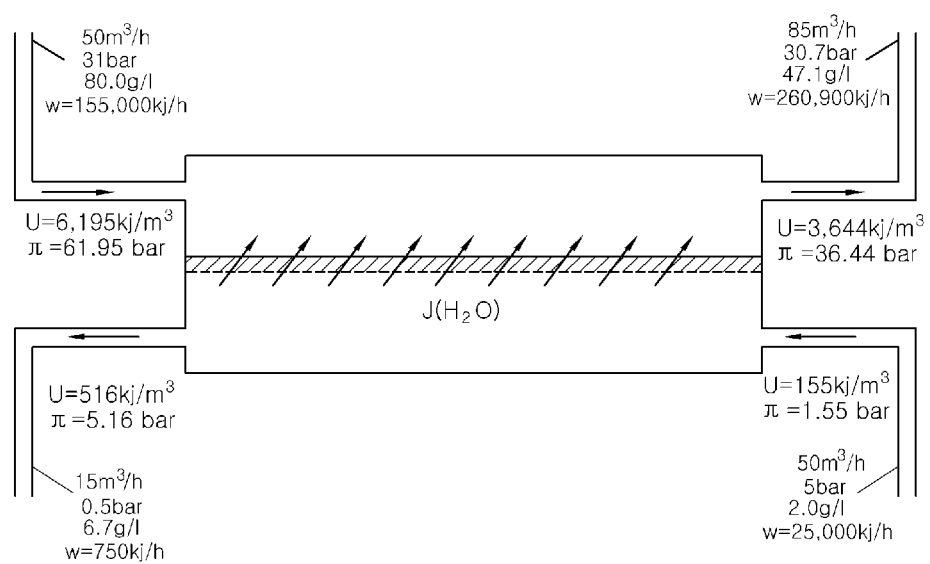
FIG. 6 is the exemplary mass and energy balance of the detailed osmotic membrane process which is used in the second preferred schematic diagram of the water treatment method in accordance with the invention.

As for the second preferred embodiment, FIG. 4 is the second preferred schematic diagram of the water method in accordance with the invention, FIG. 5 is the detailed exemplary flow diagram of the second preferred schematic diagram of the water treatment method in accordance with the invention, and FIG. 6 is the exemplary mass and energy balance of the detailed osmotic membrane process which is used in the second preferred schematic diagram of the water treatment method in accordance with the invention.

As shown in FIG. 4, the inlet solution 2 with high salinity stored in chamber 1, for example, pretreated seawater, is given to the chamber 3, where the inlet solution 2 is separated into two solutions 43 and 44. Solution 43 is given to the pressure manipulation device 49 which includes, for example, high pressure pump, and pressurized.

The first solution 44 is given to the first pressure exchange device 36 and pressurized. Pressurized first solution 45 is then separated to the second solution 68 and the third solution 67, and the third solution 67 is given to the second pressure exchange device 17 where the third solution 67 is pressurized. Pressurized third solution 46 is further exposed to the first pressure manipulation device 19, for example, booster pump.

Meanwhile, the second solution 68 is given to the second pressure manipulation device 48, for example, high pressure pump.

The solution 43 is exposed to chamber 49, and pressurized by pressurizing means for example, high pressure pump. Further pressurized solution 43, as solution 69, further pressurized second solution 10, and further pressurized third solution 47 in the first pressure manipulation device 19 are mixed to be the fourth solution. The fourth solution is then given to the first osmosis chamber 11 which includes the first semi-permeable membrane for desalination, for example, reverse osmosis.

Low salinity and potable quality stream 12, for example, permeate or product water, is taken from the first osmosis chamber 11 and is given to the chamber 13 for further use, such as drinking, irrigation, or industrial use.

The fifth solution 14 which is the fourth solution with high pressure concentrated by being exposed to the first semi-permeable membrane of the first osmosis chamber 11, is exposed to the second pressure exchange device 17 for pressurizing the third solution 67.

The pressure of the fifth solution 14 is lowered after being exposed to the second pressure exchange device 17. Low pressure fifth solution 50 is than exposed to the third pressure manipulation device 51, such as booster pump, where the low pressure fifth solution 50 is pressurized to the desired levels.

The fifth solution pressurized in the third pressure manipulation device 51, as high salinity and high pressure fifth solution 52, is given as draw solution to the second osmosis chamber 25 where the high salinity and high pressure fifth solution 52 is exposed to the first surface of the second semi-permeable membrane for osmotically driven process.

Meanwhile, the chamber 62 stores any one or more than one of primary treated wastewater, secondary treated wastewater, tertiary treated wastewater, brackish water, ground and surface water, and the sixth solution 27 which has lower salinity than the high salinity and high pressure fifth solution 52, is given to the chamber 28, where the quality, quantity, pressure and volumetric flow rate of the sixth solution 27 is adjusted to the desired levels for said second semi-permeable membrane. Chamber 28 may include any manipulation device to differentiate pressure and volumetric flow rate with respect to desired quality and quantity of the aqueous solution.

Manipulated sixth solution 29 is then given to the second osmosis chamber 25 as a feed solution, and exposed to the second surface of the second semi-permeable membrane. The salinity gradient between the high salinity and high pressure fifth solution 52 and the manipulated sixth solution 29 draws water from the manipulated sixth solution 29 to the high salinity and high pressure fifth solution 52, increasing the volumetric flow rate of the high salinity and high pressure fifth solution 52.

Said first and second semi-permeable membrane may be chosen from those of nano osmosis membrane, reverse osmosis membrane, PRO membrane, RO membrane, NF membrane, etc.

Drawn water from the manipulated sixth solution 29 through the second semi-permeable membrane in the second osmosis chamber 25 has a very low salinity, and when said drawn water is mixed with the high salinity and high pressure fifth solution 52, the salinity gradient between two solutions releases Gibbs free energy of mixing. Released Gibbs free energy of mixing conserves the moderate pressure level in the high salinity and high pressure fifth solution 52.

Diluted fifth solution 53 which has larger volumetric flow rate and relatively same pressure than the high salinity and high pressure fifth solution 52, is taken from the second osmosis chamber 25, and is given to the first pressure exchange device 36 for pressurizing the first solution 44. Depressurized fifth solution 54 is then given to chamber 55 for further treatment or disposing processes.

Meanwhile, concentrated sixth solution 30, which lost water by being exposed to the second semi-permeable membrane, is given to the chamber 31 for further treatment or saving.

FIG. 5 shows a detailed exemplary diagram of the mass balance of the second preferred embodiment including the salinity, volumetric flow rate, and pressure specifications of the streams. Mass balance calculations are based on 100 m³/h volumetric flow rate of inlet high salinity aqueous solution, such as pre-treated seawater, 50% recovery efficiency of first semi-permeable membrane process, such as SWRO, of the first osmosis chamber 11, and 70% volumetric flow rate increase from the second semi-permeable membrane process, such as PRO, of the second osmosis chamber 25.

FIG. 6 is the exemplary mass and energy balance of the detailed osmotic membrane process which is used in the second preferred schematic diagram of the water treatment method in accordance with the invention.

Figure 7:
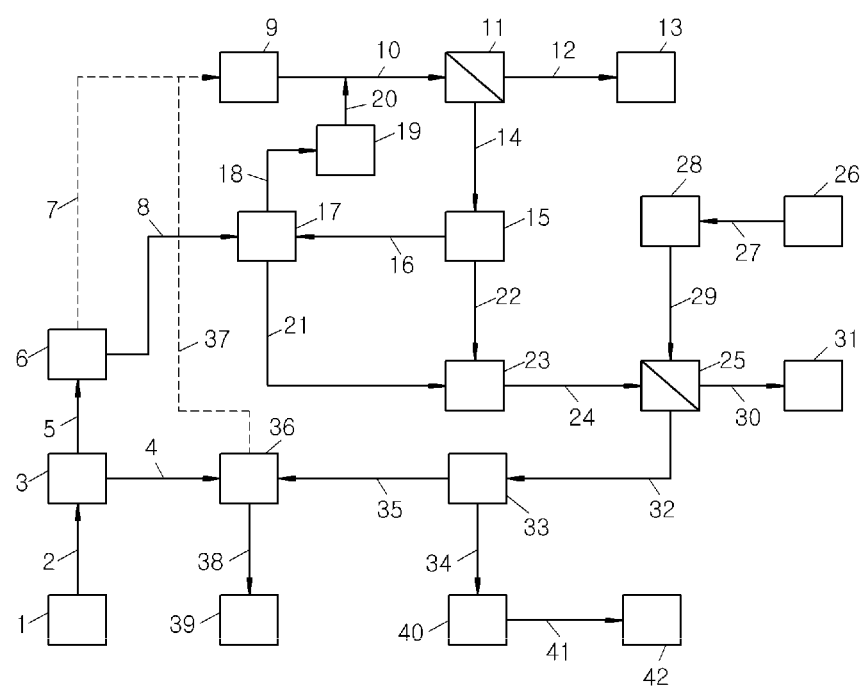
FIG. 7 is the third preferred schematic diagram of the water method in accordance with the invention.
Figure 8:
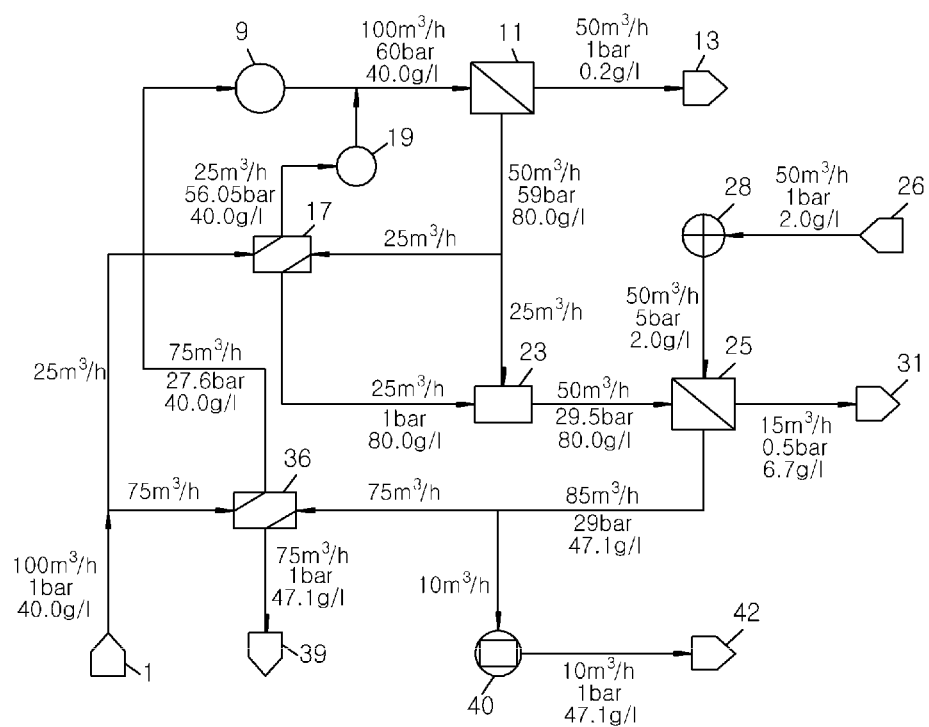
FIG. 8 is the detailed exemplary schematic diagram of the third preferred schematic diagram of the water treatment method in accordance with the invention.
Figure 9:
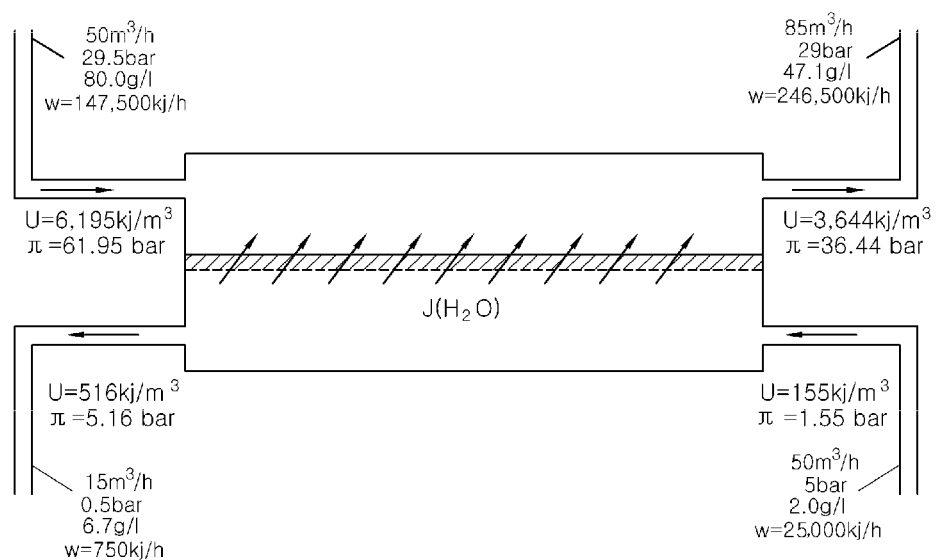
FIG. 9 is the exemplary mass and energy balance of the detailed osmotic membrane process which is used in the third preferred schematic diagram of the water treatment method in accordance with the invention.

As for the third preferred embodiment, FIG. 7 is the third preferred schematic diagram of the water method in accordance with the invention, and FIG. 8 is the detailed exemplary schematic diagram of the third preferred schematic diagram of the water treatment method in accordance with the invention, and FIG. 9 is the exemplary mass and energy balance of the detailed osmotic membrane process which is used in the third preferred schematic diagram of the water treatment method in accordance with the invention.

As shown in FIG. 7, the inlet solution with high salinity stored in chamber 1, for example, pretreated seawater is given to the chamber 3 as the first solution 2. In chamber 3, the first solution 2 is separated into two solutions 4 and 5, and then, the solution 5 is given to the chamber 6, and separated into two solutions 7 and 8. The stream of the solution 7 is the start-up stream for the desalination process and after the desalination process is started, the stream of the solution 7 is shut-down. The solution 8 is given to the second pressure exchange device 17 as the third solution and is pressurized to predetermined level. Pressurized third solution 18 is exposed to the first pressure manipulation device 19 for example, booster pump.

The solution 4 is given to the first pressure exchange device 36 and is pressurized. Pressurized solution 4, as the second solution 37, is then exposed to the second pressure manipulation device 9, for example, high pressure pump, and is pressurized.

Pressurized second solution 10 is mixed with further pressurized third solution 20 to be the fourth solution, and the fourth solution is given to the first osmosis chamber 11, which includes the semi-permeable membrane for desalination, for example, reverse osmosis.

Low salinity and potable quality stream 12, for example, permeate or product water, is taken from the first osmosis chamber 11 and is given to the chamber 13 for further use, such as drinking, irrigation, or industrial use.

The fifth solution 14 which is the fourth solution with high pressure concentrated by being exposed to the first semi-permeable membrane of the first osmosis chamber 11, is given to the chamber 15 and separated into two solutions 16 and 22.

The solution 16 is given to the second pressure exchange device 17 for pressurizing the third solution 8.

Depressurized solution 16 which is depressurized after being exposed to the second pressure exchange device 17, is given as solution 21 to the third pressure manipulation device 23 where the solution 16 is mixed with solution 22 and pressurized. Mixed and pressurized solution, as the fifth solution 24, is then given to the second osmosis chamber 25. The fifth solution 24 as high salinity and high pressure draw solution, is given to the second osmosis chamber 25 where the fifth solution 24 is exposed to the first surface of the second semi-permeable membrane for osmotically driven process.

Meanwhile, the chamber 26 stores any one or more than one of primary treated wastewater, secondary treated wastewater, tertiary treated wastewater, brackish water, ground and surface water, and the sixth solution 27 which has lower salinity than the fifth solution 24, is given to the chamber 28, where the quality, quantity, pressure and volumetric flow rate of the sixth solution 27 is adjusted to the desired levels for said second semi-permeable membrane. Chamber 28 may include any manipulation device to differentiate pressure and volumetric flow rate with respect to desired quality and quantity of the aqueous solution.

Manipulated sixth solution 29 is then given to the second osmosis chamber 25 as a feed solution, and exposed to the second surface of the second semi-permeable membrane. The salinity gradient between the fifth solution 24 and the manipulated sixth solution 29 draws water from the manipulated sixth solution 29 to the fifth solution 24, increasing the volumetric flow rate of the fifth solution 24.

Said first and second semi-permeable membrane may be chosen from those of nano osmosis membrane, reverse osmosis membrane, PRO membrane, RO membrane, NF membrane, etc.

Drawn water from the manipulated sixth solution 29 through the second semi-permeable membrane in the second osmosis chamber 25 has a very low salinity, and when said drawn water is mixed with the fifth solution 24, the salinity gradient between two solutions releases Gibbs free energy of mixing. Released Gibbs free energy of mixing conserves the moderate pressure level in the fifth solution 24.

Diluted fifth solution 32 which has larger volumetric flow rate and relatively same pressure than the fifth solution 24, is taken from the second osmosis chamber 25, and is given to the chamber 33 where the diluted fifth solution 32 is separated into two solutions 34 and 35.

Solution 35 is given to the first pressure exchange device 36 for pressurizing the solution 4. Depressurized solution 35 is then given to chamber 39 for further treatment or disposing processes.

Meanwhile, concentrated sixth solution 65, which lost water by being exposed to the second semi-permeable membrane, is given to the chamber 66 for further treatment or saving.

FIG. 2 shows a detailed exemplary diagram of the mass balance of the first preferred embodiment including the salinity, volumetric flow rate, and pressure specifications of the solutions. Mass balance calculations are based on 100 m3/h volumetric flow rate of inlet high salinity aqueous solution, such as pre-treated seawater, 50% recovery efficiency of first semi-permeable membrane process, such as SWRO, of the first osmosis chamber 11, and 100% volumetric flow rate increase from the second semi-permeable membrane process, such as PRO, of the second osmosis chamber 25.

Solution 34 is given to the energy producing device 40, such as Pelton turbine, where the potential and kinetic energy of the solution 34 is converted to energy. Depresurized solution 34, as solution 41, is then given to the chamber 42 for further treatment or disposing processes.

Meanwhile, concentrated sixth solution 30, which lost water by being exposed to the second semi-permeable membrane, is given to the chamber 31 for further treatment or saving.

FIG. 8 shows a detailed exemplary diagram of the mass balance of the first preferred embodiment including the salinity, volumetric flow rate, and pressure specifications of the solutions. Mass balance calculations are based on 100 $m^3$/h volumetric flow rate of inlet high salinity aqueous solution, such as pre-treated seawater, 50% recovery efficiency of first semi-permeable membrane process, such as SWRO, of the first osmosis chamber 11, and 100% volumetric flow rate increase from the second semi-permeable membrane process, such as PRO, of the second osmosis chamber 25.

FIG. 9 is the exemplary mass and energy balance of the detailed osmotic membrane process which is used in the third preferred schematic diagram of the water treatment method in accordance with the invention.

Accordingly, it is to be understood that the embodiments of the invention herein described are merely illustrative of the application of the principles of the invention. Reference herein, to details of the illustrated embodiments are not intend to limit the scope of the claims, which themselves recite those features. It should be understood by those skilled in the art that various changes may be made and equivalents may be substituted without departing from the true meaning and scope of the invention. In addition, many modifications may be made to adapt a particular situation, material, composition of matter, process, process step or steps, to the objective, meaning and scope of the present invention. All such modifications are intended to e within the scope of the claims appended hereto.

What is claimed is:

1. A membrane based desalination method comprising:
achieving a first solution from salinity water source;
pressurizing the first solution in a first pressure exchange device;
separating the first solution into a second solution and a third solution;
pressurizing the second solution;
pressurizing the third solution in a second pressure exchange device;
mixing the second solution and the third solution as a fourth solution;
providing the fourth solution to a first semi-permeable membrane to achieve product water;
providing a fifth solution, which is the fourth solution excluding the product water, to the second pressure exchange device for pressurizing the third solution;
providing the fifth solution to a second semi-permeable membrane after pressurizing the third solution;
achieving a sixth solution which has lower salinity than the fifth solution; and
providing the sixth solution to the second semi-permeable membrane for drawing water from the sixth solution to the fifth solution by salinity gradient,
wherein after drawing water from the sixth solution to the fifth solution, the fifth solution is given to the first pressure exchange device for pressurizing the first solution.

2. The method of claim 1, further comprising:
recycling or discharging the fifth solution after pressurizing the first solution.

3. The method of claim 2, wherein said recycling is converting energy of the fifth solution by providing the fifth solution to an energy producing device.

4. The method of claim 3, wherein the energy producing device is turbine.

5. The method of claim 1, wherein quality, quantity, pressure and volumetric flow rate of the sixth solution is adjusted before the sixth solution is provided to the second semi-permeable membrane.

6. The method of claim 1, wherein the third solution is further pressurized by the first pressure manipulation device after pressurized by the second pressure exchange device.

7. The method of claim 6, wherein the first pressure manipulation device is pump.

8. The method of claim 1, wherein said pressurizing the second solution, the second solution is pressurized by the second pressure manipulation device.

9. The method of claim 8, wherein the second pressure manipulation device is pump.

10. The method of claim 1, wherein the fifth solution is brackish water.

11. The method of claim 1, wherein said the first semi-permeable membrane and the second semi-permeable membrane are any one among forward osmosis membrane, reverse osmosis membrane, PRO membrane, RO membrane, and NF membrane.

12. The method of claim 1, wherein the fifth solution is any one among primary treated wastewater, secondary treated wastewater, tertiary treated wastewater, brackish water, and ground and surface water.

13. The method of claim 1, wherein providing the sixth solution, pressure of the fifth solution is maintained by Gibbs free energy of mixing released by the salinity gradient and volumetric expansion.

\* \* \* \* \*